Aug. 24, 1943.  S. C. ROGERS  2,327,820
LIGHT PROJECTOR
Filed May 30, 1942  2 Sheets-Sheet 1
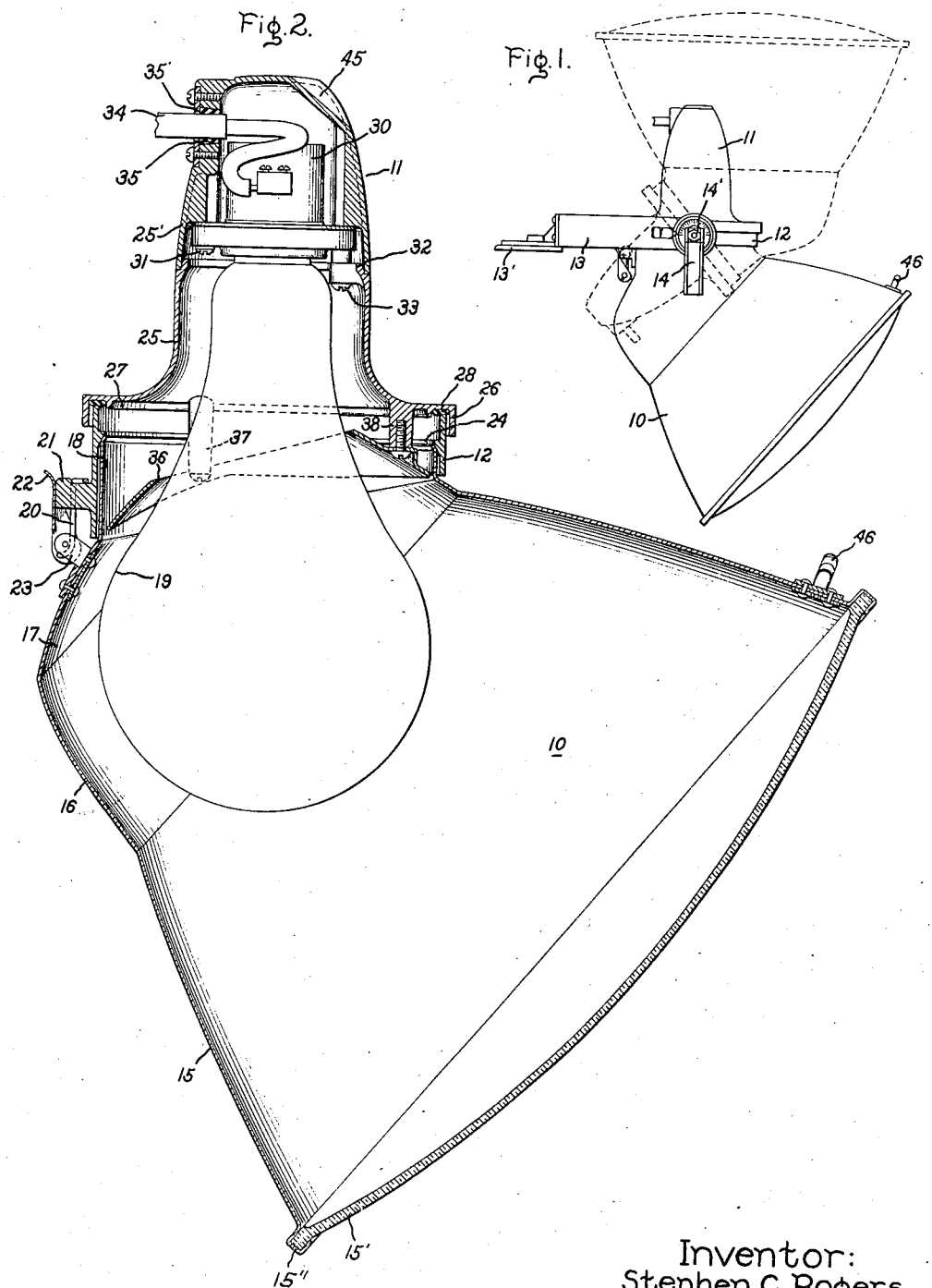
Inventor:
Stephen C. Rogers,
by Harry E. Dunham
His Attorney.

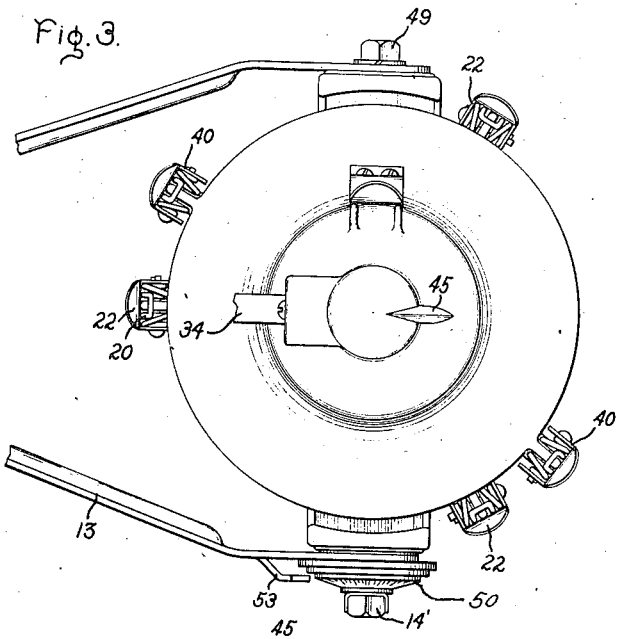
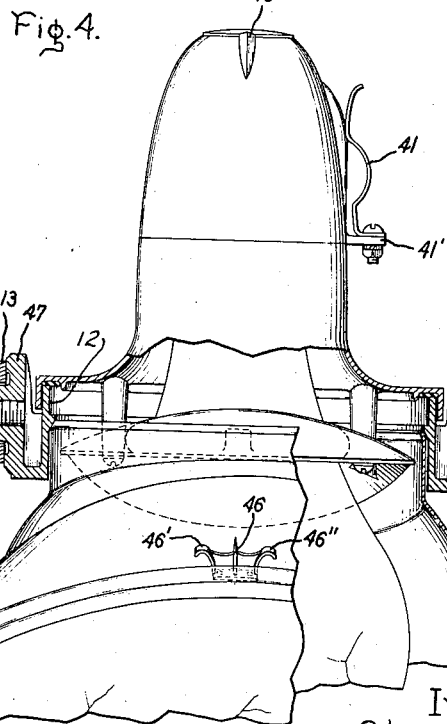

Patented Aug. 24, 1943

2,327,820

UNITED STATES PATENT OFFICE 2,327,820

LIGHT PROJECTOR

Stephen C. Rogers, Marblehead, Mass., assignor to General Electric Company, a corporation of New York Application May 30, 1942, Serial No. 445,133

5 Claims. (Cl. 240—3)

My invention relates to light projectors and more specifically to floodlighting projectors.

One object of my invention is to provide a light projector which may be positioned during daylight to project its beam onto a predetermined area when the projected light beam itself is invisible for that purpose.

Another object of my invention is to provide a projector which may be economically manufactured and economically serviced after installation.

For a better understanding of my invention, together with other and further objects thereof, reference is had to the following description taken in connection with the accompanying drawings, and its scope will be pointed out in the appended claims.

In the accompanying drawings, Fig. 1 is a side elevation illustrating my improved projector by solid lines in the usual operating position and by dotted lines in a second position; Fig. 2 is a cross sectional elevation through the center of the projector of Fig. 1; Fig. 3 is a fractional top view; and Fig. 4 is a fractional front elevation of the projector partly in section.

Referring to the drawings in detail, Fig. 1 discloses a projector comprising a reflector 10, a hood or socket housing 11, a supporting ring 12, and a yoke 13. The supporting ring 12 is pivoted between the arms of the yoke 13, which yoke may be attached to a cross arm or other suitable supporting means by means of a lug 13'. A hand wrench 14 is provided at the pivot between one arm of the yoke 13 and the ring 12 to operate a locking bolt 14' whereby the reflector 10 may be locked in either of the two positions indicated in Fig. 1 or in an intermediate position.

The reflector 10 as shown in Fig. 2 comprises a conoid having several sections, each section having a specific curvature intercepting adjacent solid angles of light projected from a focal point and each section reflecting its intercepted light directly or indirectly into the beam. The largest section of the reflector is a paraboloidal section 15 the large end of which is closed by a suitable lens 15', the lens 15' being held in place by the edge 15" of the reflector which is rolled over the edge of the lens. An elliptical section 16 is adjacent thereto, and a parabolical or elliptical section 17 closes the end of the reflector. An opening is provided in the sections 16 and 17 bounded by a cylindrical section 18 the axis of which is at an angle of about 50° to the axis of the sections 15, 16 and 17. This arrangement permits a vertical positioning of the lamp in the usual operating position of the reflector. The section 18 is of sufficient size to permit the insertion and removal of a light source such as an incandescent lamp 19, for example. The reflector 10 is attached to the ring 12 by three equally spaced latches, each latch comprising a bail 20 hooked over a suitable lug 21 on the ring and pivoted upon a latching lever 22. The latching lever 22 is in turn pivoted upon a lug 23 attached to the reflector. The pivot axes of the bail and lever are spaced so that in the upward position of the lever the bail is drawn downwardly to draw the reflector up against the ring. A suitable flange 24 is provided on the inner surface of the ring 12 against which the slightly crimped edge of the cylindrical section 18 of the reflector rests when the reflector is drawn against the ring by the closing of the latches.

The hood 11 comprises two sections 25 and 25'. The section 25 is bell shaped and is provided at its lower end with an outer cylindrical flange 26. A flange 27 concentric with flange 26 is provided to position a packing ring 28 in position to seal the joint between the edge of the ring 12 and the surface of the hood 11. The upper section 25' of the hood 11 is cup shaped, supports a socket 30 by means of screws 31 and rests upon a ledge 32 slightly spaced from the upper edge of the section 25, being attached thereto by screws 33. A suitable cable 34 is connected to the socket to carry current thereto. This cable enters that hood section 25' through a cable bushing 35. The bushing 35 projects through a suitable opening in the wall of the hood section and is sealed therein by a plate 35' screwed to the outside of the section.

The hood section 25 supports a ring-shaped reflector 36 which is attached to lugs 37 and 38 projecting from the inner surface of the hood section 25. The ring-shaped reflector is given a profile curvature such as to form a continuation of the reflector sections 16 and 17, the outer diameter of the ring substantially closing the opening in the reflector 10 bounded by the cylindrical section 18. The inner diameter of the ring 36 is sufficiently large to accommodate the stem of the lamp 19.

The complete hood assembly with the lamp is attached to the ring 12 by means of two latches 40 (see Fig. 3) similar to the latches used for attaching the reflector to the ring 12 and may readily be removed without disturbing the reflector or the reflector supporting ring. These latches are not diametrically opposite each other so that this section 25 can be placed upon the ring 12 in a reversed position but only in its one correct position. A spring clip 41 is attached to a lug 41' projecting from the side of the hood, in any suitable manner so that during lamp renewal this hood may be inverted and hooked onto the yoke arm 13. This frees the hands of the operator for the reflector cleaning and for other servicing operation.

For the purpose of adjusting or positioning the reflector during installation or at any subsequent time, the hood or socket housing 11 is provided with a sighting notch 45 at its upper end, and the reflector is provided with a sighting bead 46 attached to the forward end of the reflector. The sighting bead 46 is combined with a pair of grip hooks 46' and 46'' which may be grasped to move the reflector about its pivot for adjustment. The base line of the V-shaped notch and the edge of the sighting bead are lined up to provide a sighting line parallel to the axis of the reflector 10, and in order to position the center of the beam with any particular area of the surface to be lighted it is necessary only to align the sights on the projector with the point which is desired to be the center of the projected beam. This may be done accurately during daylight hours. This procedure saves considerable time over the methods heretofore used and avoids the disadvantages of working on these floodlights during darkness and at the time they are actually in use.

The supporting ring 12 is provided with lugs 47 and 48 (see Fig. 4) through which the pivot bolts 14' and 49 are threaded. The head of the pivot bolt 49 and the washers thereunder in this instance are spaced from the surface of the lug 48 by a hub flange 48' sufficiently to provide a sliding engagement of the arm of the yoke against the lug 48 on one side of the projector. A degree marking washer 50 is inserted between the head of the bolt 14' and the yoke arm on the other side of the projector to provide an accurate indication of the floodlight position before the bolt is tightened. This degree marking and clamping washer is described in detail in U. S. Patent 2,241,059, issued May 6, 1941, to J. P. Foulds.

An additional positioning ring 50' is provided on the periphery of the washer 50. This ring is provided with a lug 51 and a screw 52. The ring may be moved about the periphery of the washer 50 until the lug 51 touches an indicating lug 53 on the arm 13 (see Fig. 3). The screw 52 is then tightened against the periphery of the washer 50 and if it becomes necessary to move the floodlight away from its adjusted position it may be returned to that position merely by moving the reflector until the lug 51 again engages the pointer lug 53.

In the installation of the projector as described the reflector is moved about its pivot by the adjusting hooks 46' and 46'' attached to the sighting bead 46. When this positioning is completed, a mere tightening of the bolt 14' by means of the wrench 14 will maintain the reflector in that position. In subsequent servicing operations the reflector and the hood may be removed separately from the supporting ring as required and may be replaced by the mere operation of the latches. In each instance the original positioning of the hood and reflector relatively to each other and relatively to the ring will be maintained. If, on the other hand, it is found necessary to move the entire assembly about its pivot, the repositioning ring 50' provided on the washer 50 comprises an accurate guide for the return of the floodlight to its previous position. This provides an improved flexibility in operation, and its structural simplicity makes it a subject for economical mass production.

What I claim as new and desire to secure by Letters Patent of the United States is:

1. In a light projector, the combination of a conoidal reflector, a supporting yoke for said reflector, a housing projecting from the side of said reflector, an adjustable mounting between said reflector and said yoke, a sighting notch on said housing, a sighting bead mounted on said reflector arranged in respect to said sighting notch to provide a sighting line parallel to the axis of said reflector, and gripping means combined with said sighting bead, whereby said reflector may be adjusted relatively to its yoke.

2. In a projector, the combination of a reflector, a yoke, a socket housing arranged at an angle to the axis of said reflector, an adjustable mounting between said reflector and yoke, a sighting bead mounted on said reflector, and a sighting notch on said housing, said notch and bead being arranged to provide a sighting line parallel to the reflector axis, whereby the said reflector may be aimed at a desired area to be illuminated by sighting along the notch and bead.

3. In a floodlighting projector, the combination of a yoke, a reflector, a socket housing attached thereto, the axis of said socket housing being at an angle to the axis of said reflector, a pivotal mounting between said reflector and said yoke, a locking device for adjusting said reflector in any desired position upon said yoke, a sighting bead mounted on said reflector, and a sighting notch on said socket housing, said bead and notch being aligned parallel with the axis of said reflector so that said reflector may be positioned to project its beam onto a predetermined area without the use of said beam.

4. In a floodlighting projector, the combination of a yoke, a ring pivotally mounted on said yoke, a reflector, a socket housing, sighting means on said socket housing and said reflector for sighting the axis of said reflector relatively to a selected point in the area which is to be illuminated by said projector, and means for attaching said reflector and said housing to said ring in a predetermined relation to each other so that said sighting means on said housing and said reflector will always be in proper relation to each other to function as the sighting means for said projector.

5. In a floodlighting projector, the combination of a yoke, a ring adjustably mounted upon said yoke, a socket housing provided with a sighting notch, a reflector provided with a sighting bead, and means for latching said reflector and socket housing to said ring in a predetermined relation so that said sighting notch and said sighting bead will always be in position to function as a sighting means for the light beam projected by said reflector.

STEPHEN C. ROGERS.